US012615438B2

(12) United States Patent
Furuta et al.

(10) Patent No.: US 12,615,438 B2
(45) Date of Patent: Apr. 28, 2026

(54) WAVEFORM GENERATING APPARATUS, SHAKE EVALUATING APPARATUS, WAVEFORM GENERATING METHOD, CAMERA SHAKE AMOUNT MEASURING METHOD, AND STORAGE MEDIUM

(71) Applicant: CANON KABUSHIKI KAISHA, Tokyo (JP)

(72) Inventors: Minami Furuta, Tokyo (JP); Koichi Washisu, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 296 days.

(21) Appl. No.: 18/354,829

(22) Filed: Jul. 19, 2023

(65) Prior Publication Data

US 2024/0022814 A1 Jan. 18, 2024

Related U.S. Application Data

(63) Continuation of application No. PCT/JP2021/047088, filed on Dec. 20, 2021.

(30) Foreign Application Priority Data

Jan. 25, 2021 (JP) ................................. 2021-009575

(51) Int. Cl.
*H04N 23/68* (2023.01)
(52) U.S. Cl.
CPC ................................. *H04N 23/6811* (2023.01)

(58) Field of Classification Search
CPC .... H04N 23/6811; H04N 5/222; H04N 17/00; H04N 17/002; G03B 5/00; G03B 17/56
See application file for complete search history.

(56) References Cited

U.S. PATENT DOCUMENTS

2014/0247369 A1* 9/2014 Kusaka ................ H04N 17/002
                                                            348/208.1

FOREIGN PATENT DOCUMENTS

| JP | 2008039959 | A | * | 2/2008 |
| JP | 2009211023 | A | * | 9/2009 |
| JP | 2009-222416 | A | | 10/2009 |
| WO | 2013/076964 | | | 5/2013 |
| WO | 2013/076965 | A1 | | 5/2013 |

OTHER PUBLICATIONS

Shake Correcting Device (Year: 2008).*

(Continued)

*Primary Examiner* — Twyler L Haskins
*Assistant Examiner* — Surafel Yilmakassaye
(74) *Attorney, Agent, or Firm* — Cowan, Liebowitz & Latman, P.C.

(57) ABSTRACT

A waveform generating apparatus is configured to generate an excitation waveform configured to excite an imaging unit in order to evaluate shake of the imaging unit. The waveform generating apparatus includes a memory storing instructions, and a processor configured to execute the instructions to acquire a specification of the imaging unit, and adjust a reference waveform based on the specification of the imaging unit and generate the excitation waveform.

14 Claims, 5 Drawing Sheets

(56)              References Cited

OTHER PUBLICATIONS

Ethod for Evaluating Camera Shake Correcting Function of Imaging Device and Method for Generating Camera Shake Model (Year: 2009).*
International Search Report dated Mar. 1, 2022 of International Application No. PCT/JP2021/047088, a copy of which is enclosed. PCT/IB/338 (PCT Notification of Transmittal of Translation of the International Preliminary Report on Patentability); PCT/IB/373 (PCT International Preliminary Report on Patentability); PCT/ISA/237 (PCT Written Opinion of the International Searching Authority).

* cited by examiner

51p

51y

52y

WAVEFORM GENERATING APPARATUS, SHAKE EVALUATING APPARATUS, WAVEFORM GENERATING METHOD, CAMERA SHAKE AMOUNT MEASURING METHOD, AND STORAGE MEDIUM

CROSS-REFERENCE TO RELATED APPLICATIONS

This application is a Continuation of International Patent Application No. PCT/JP2021/047088, filed on Dec. 20, 2021, which claims the benefit of Japanese Patent Application No. 2021-009575, filed on Jan. 25, 2021, both of which are hereby incorporated by reference herein in their entirety.

BACKGROUND

Technical Field

One of the aspects of the embodiments relates to a shake evaluating apparatus that evaluates camera shake, and a waveform generating apparatus that generates a (vibration) excitation waveform that excites (or vibrates) a camera for shake evaluation.

Description of Related Art

PCT International Publication No. WO 2013/076964 discloses a measuring apparatus for measuring an effect of an image stabilizing function of a target camera, by imaging a shake measurement chart by the target camera while the target camera is fixed to a (vibration) excitation table of a (vibration) excitation apparatus, and by analyzing the resultant image using a computer.

The shake state of the camera (imaging unit) changes depending on the specification such as the weight of the camera. Therefore, in order to evaluate the camera shake with high accuracy, it is necessary to consider camera shake changes according to the camera specification. Therefore, the measurement apparatus disclosed in WO 2013/076964 may not be able to evaluate the camera shake with high accuracy.

SUMMARY

A waveform generating apparatus according to one aspect of the disclosure is configured to generate an excitation waveform configured to excite an imaging unit in order to evaluate shake of the imaging unit. The waveform generating apparatus includes a memory storing instructions, and a processor configured to execute the instructions to acquire a specification of the imaging unit, and adjust a reference waveform based on the specification of the imaging unit and generate the excitation waveform. A shake evaluation apparatus having the above waveform generating apparatus also constitutes another aspect of the disclosure. A waveform generating method corresponding to the above waveform generating apparatus also constitutes another aspect of the disclosure. A non-transitory computer-readable storage medium storing a program that causes a computer to execute the above waveform generating method also constitutes another aspect of the disclosure.

A measuring method of a shake amount of a camera according to another aspect of the disclosure includes the steps of acquiring an excitation waveform according to mass of the camera fixed to an excitation table of an excitation apparatus, acquiring an evaluation image by imaging an object while the excitation table is vibrated according to an acquired excitation waveform, and measuring a blur amount in an image based on the evaluation image. The excitation waveform acquired in the step of acquiring the excitation waveform has a larger ratio of vibration equal to or smaller than a first frequency in a case where the mass of the camera has a first value, than that a second value. A non-transitory computer-readable storage medium storing a program that causes a computer to execute the above measuring method also constitutes another aspect of the disclosure.

Further features of the disclosure will become apparent from the following description of embodiments with reference to the attached drawings.

DESCRIPTION OF THE EMBODIMENTS

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure.

Figure 1:
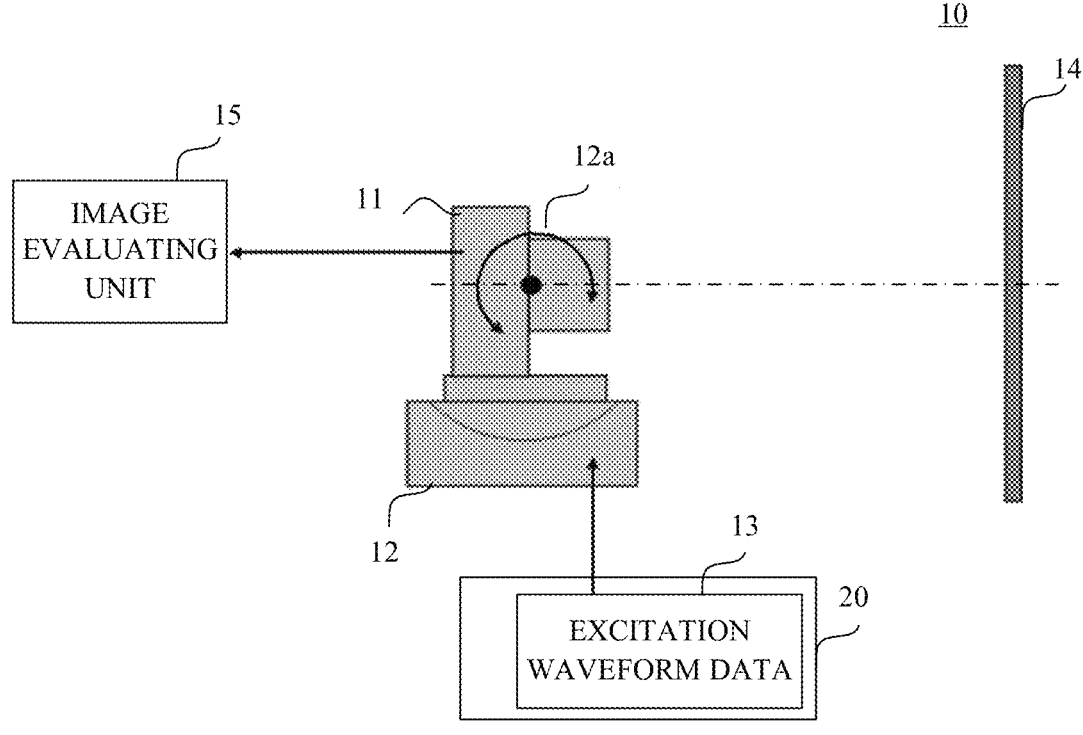
FIG. 1 is a schematic diagram of a shake evaluating apparatus according to this embodiment.

Referring now to FIG. 1, a description will be given of a shake evaluating apparatus 10 according to this embodiment. FIG. 1 is a schematic diagram of the shake evaluating apparatus 10. The shake evaluating apparatus 10 is configured to evaluate camera shake, that is, a camera shake amount (deterioration degree of a captured image).

Reference numeral 11 denotes a camera (imaging unit) as an evaluation target. The camera 11 is installed on a (vibration) excitation table ((vibration) excitation unit) 12. The excitation table 12 can vibrate the camera 11 around arrows 12a based on excitation waveform data 13 generated by the waveform generating apparatus 20. The camera 11 faces a chart 14 as an object, and captures a chart image (captured image) while the camera 11 is vibrated by the excitation table 12. An image evaluating unit 15 inputs the chart image captured by the camera 11. The image evaluating unit 15 detects the contrast of the chart image and measures the deterioration degree (bokeh amount) of the captured image due to (vibration) excitation. The image evaluating unit 15 evaluates shake of the camera 11 based on the deterioration degree of the captured image. That is, the image evaluating unit 15 evaluates the image captured by the camera 11 while the camera 11 is excited using the excitation waveform data 13. Since the outline of the evaluation method according to this embodiment is well-known, a description thereof will be omitted.

Figure 2:
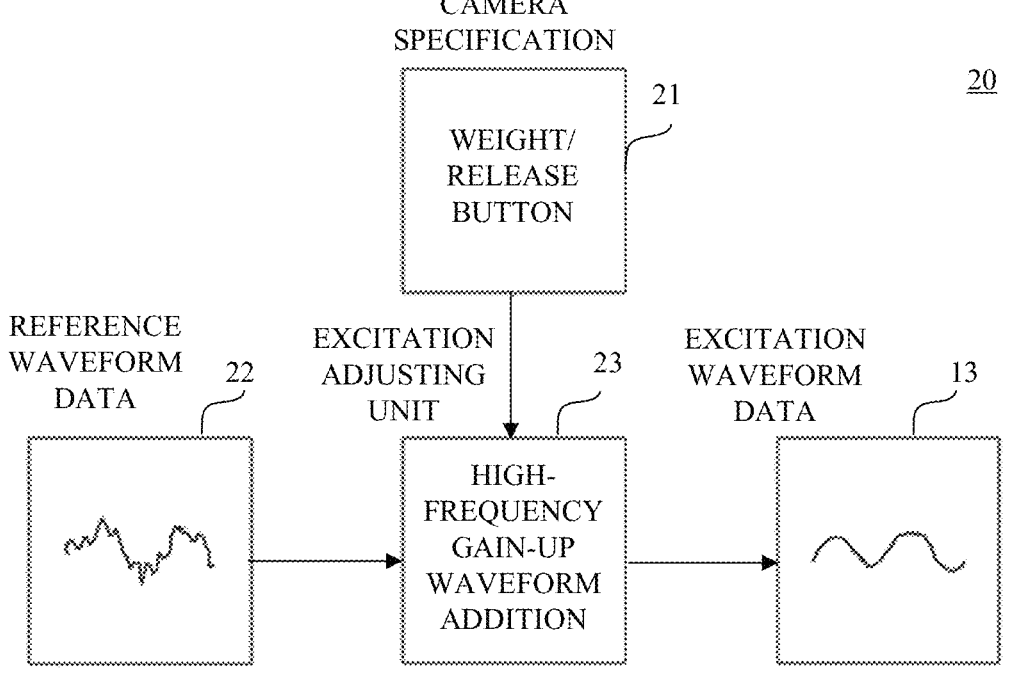
FIG. 2 explains a waveform generating method according to this embodiment.

Referring now to FIG. 2, a description will be given of a method (waveform generating method) of generating the excitation waveform data 13 by the waveform generating apparatus 20. FIG. 2 explains a method of generating the excitation waveform data 13. In FIG. 2, reference waveform data 22 is excitation waveform data that serves as a reference, and is a model waveform (model camera shake waveform) created based on statistics using camera shake data from a plurality of types of cameras (cameras having different specifications such as the weights and release button positions). The reference waveform data 22 are stored, for example, in a memory of the waveform generating apparatus 20. A (vibration) excitation adjusting unit 23 adjusts the reference waveform data 22 and generates the excitation waveform data 13.

A description will now be given of the adjustment of the reference waveform data 22 by the excitation adjusting unit 23. Reference numeral 21 denotes a camera specification (acquiring unit for acquiring the camera specification), which is data regarding the specification of the camera 11 to be evaluated. The camera specification 21 includes, but is not limited to, the weight of the camera 11 and the position of the release button. In this embodiment, the excitation adjusting unit 23 adjusts the reference waveform data 22 based on the camera specification 21 as follows. The camera specification 21 may be acquired using communication with the camera, or may be acquired by receiving input from the user.

In a case where the camera 11 is light, the excitation adjusting unit 23 is obtained by increasing the gain of the entire waveform of the reference waveform data 22. In a case where the release button of the camera 11 is not on the top surface of the terminal parallel to the optical axis, the excitation adjusting unit 23 adds a waveform to shake in a predetermined direction. The reason for adjusting the reference waveform data 22 in this manner will be described below.

In a case where the camera 11 is light, the inertial force of the camera 11 is small, so camera shake of the entire waveform increases. In order to deal with this, the excitation adjusting unit 23 increases the gain of the entire waveform of the reference waveform data 22 to increase the amplitude of camera shake and generates the excitation waveform data 13.

Figure 3A:
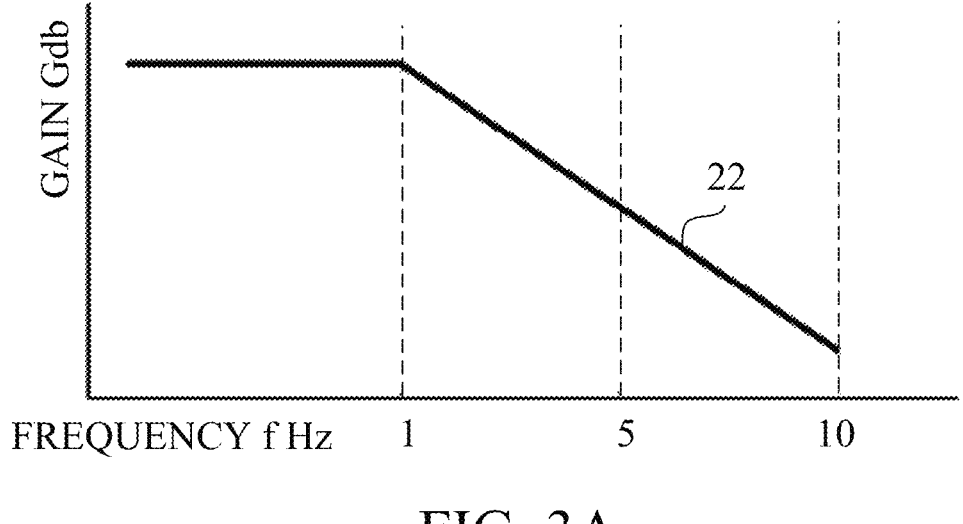
FIGS. 3A and 3B illustrate frequency characteristics of a camera according to this embodiment.
Figure 3B:
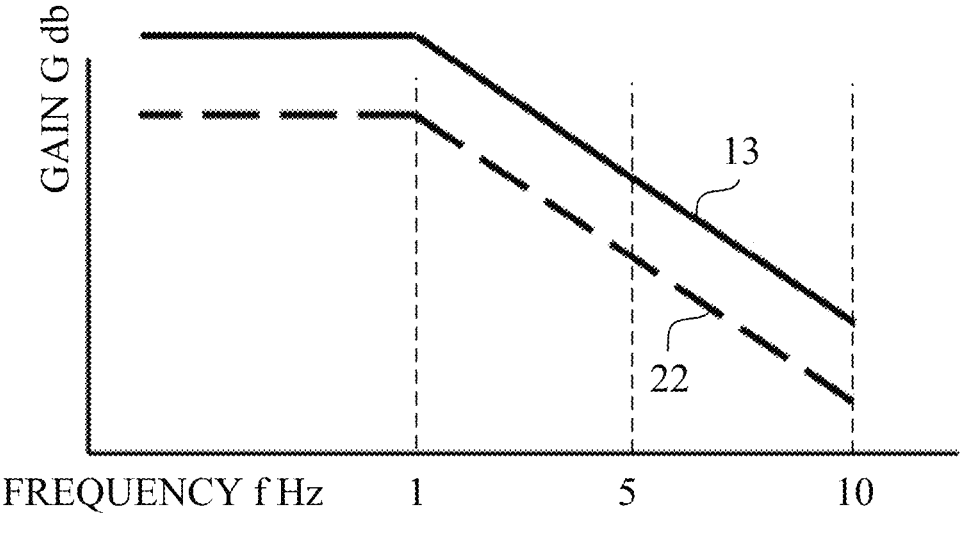

Referring now to FIGS. 3A and 3B, a description will be given of the frequency characteristic in a case where the camera 11 is light. FIG. 3A illustrates frequency characteristic of the reference waveform data 22. In FIG. 3A, the horizontal axis indicates frequency f (Hz) and the vertical axis indicates gain G (db). The reference waveform data 22 has a characteristic that the waveform of a frequency higher than 1 Hz becomes smaller in inverse proportion to the frequency. FIG. 3B illustrates the frequency characteristic of the excitation waveform data 13 obtained by increasing the gain of the entire reference waveform data 22. In FIG. 3B, the horizontal axis indicates frequency f (Hz) and the vertical axis indicates gain G (db). In a case where the camera 11 is lightweight, the excitation adjusting unit 23 increases the gain of the entire reference waveform data 22 and generates the excitation waveform data 13, as illustrated in FIG. 3B. In this embodiment, in a case where the camera 11 to be evaluated is lighter than the reference camera, the camera 11 is excited by setting a stepless boost filter according to the weight of the camera 11.

Figure 4:
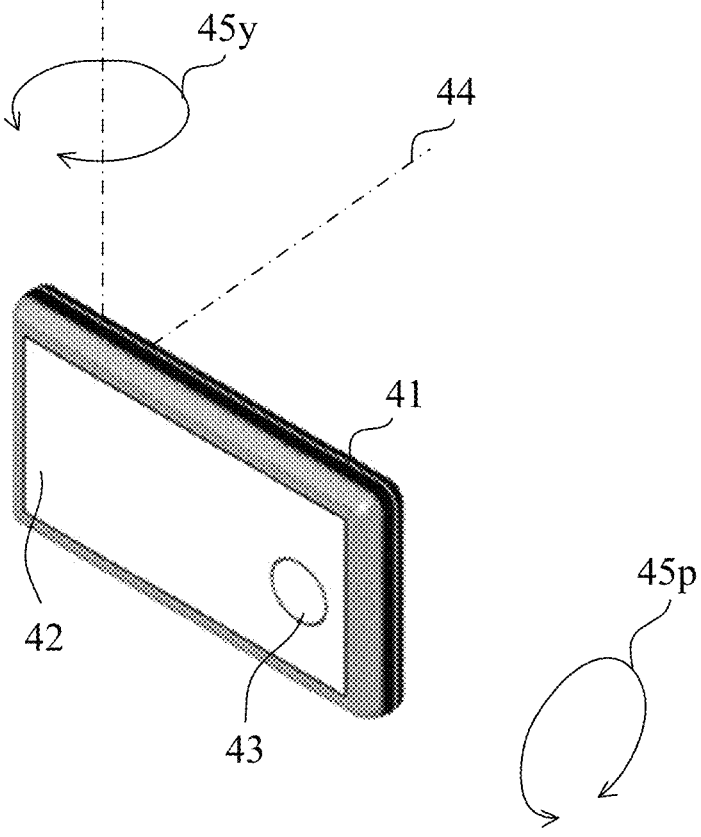
FIG. 4 is a perspective view of a mobile terminal according to this embodiment.

Referring now to FIG. 4, a description will be given of a camera in which a release button is not located on the top surface of the terminal parallel to the optical axis. FIG. 4 is a perspective view of a mobile terminal (camera 41 as an imaging unit) according to this embodiment. As illustrated in FIG. 4, in the camera 41, the user often takes a picture by operating a release button 43 provided on a rear surface (monitor surface 42). In this case, the release button 43 of the camera 41 is not disposed on the top surface of the terminal parallel to the optical axis 44 of the camera 41.

Since the release button 43 is operated away from the optical axis 44 of the camera 41 in this way, and the same direction as the gripping force of the camera 41 becomes the operation direction of the release button 43, large rotational shake occurs in the rotational direction as illustrated by arrows 45p and 45y. Accordingly, this embodiment adds camera shake caused by operating the release button 43 to the excitation waveform in these rotational directions (predetermined directions).

Figure 5A:
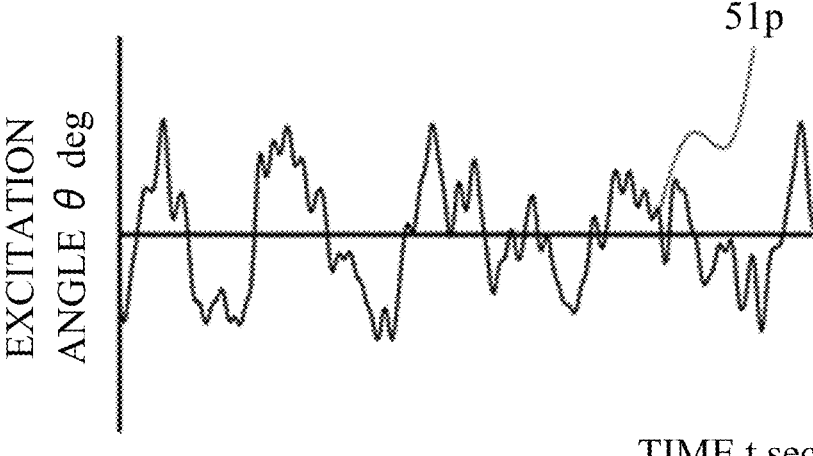
FIGS. 5A, 5B, and 5C are excitation waveforms of the camera according to this embodiment.
Figure 5B:
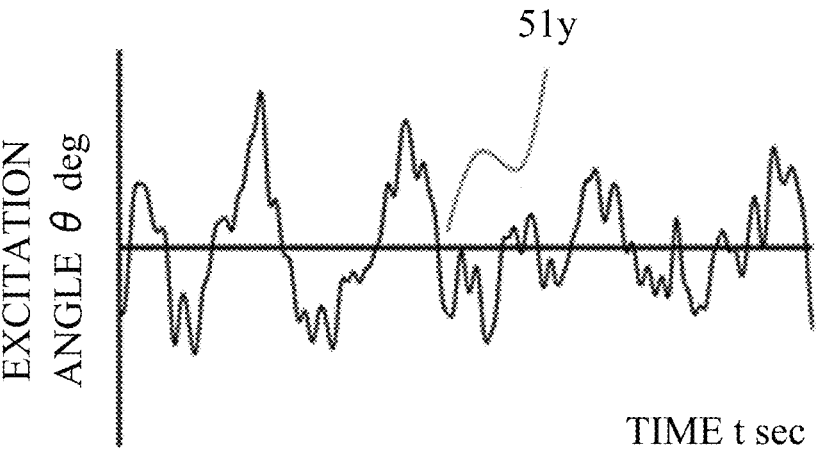
Figure 5C:
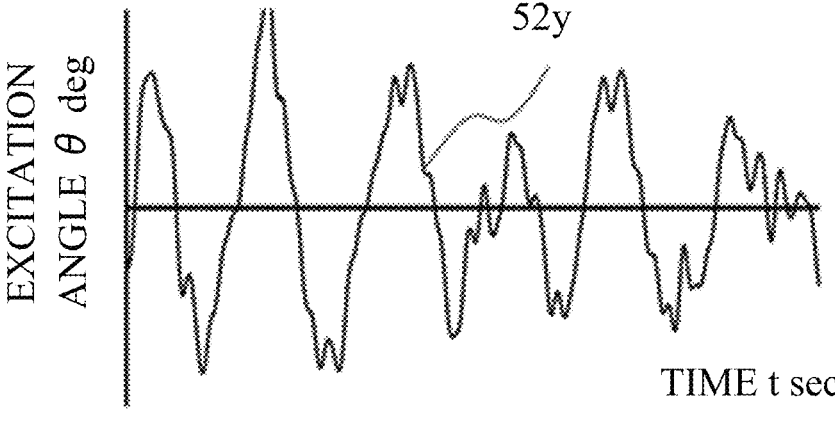

Referring now to FIGS. 5A to 5C, a description will be given of the excitation waveform of the camera 41, that is, the excitation waveform in a case where the release button 43 is not located on the top surface of the terminal parallel to the optical axis 44. FIG. 5A illustrates an excitation waveform 51p in the rotation direction indicated by the arrow 45p in FIG. 4. FIG. 5B illustrates an excitation waveform 51y in the rotation direction indicated by the arrow 45y in FIG. 4. FIG. 5C illustrates an excitation waveform 52y as a result of that a large-amplitude waveform is added at 1 Hz, for example, as the camera shake caused by the release operation only to the excitation waveform 51y as the operating direction of the release button 43. In FIGS. 5A to 5C, the horizontal axis indicates time t (sec) and the vertical axis indicates vibration angle θ (deg).

Figure 6:
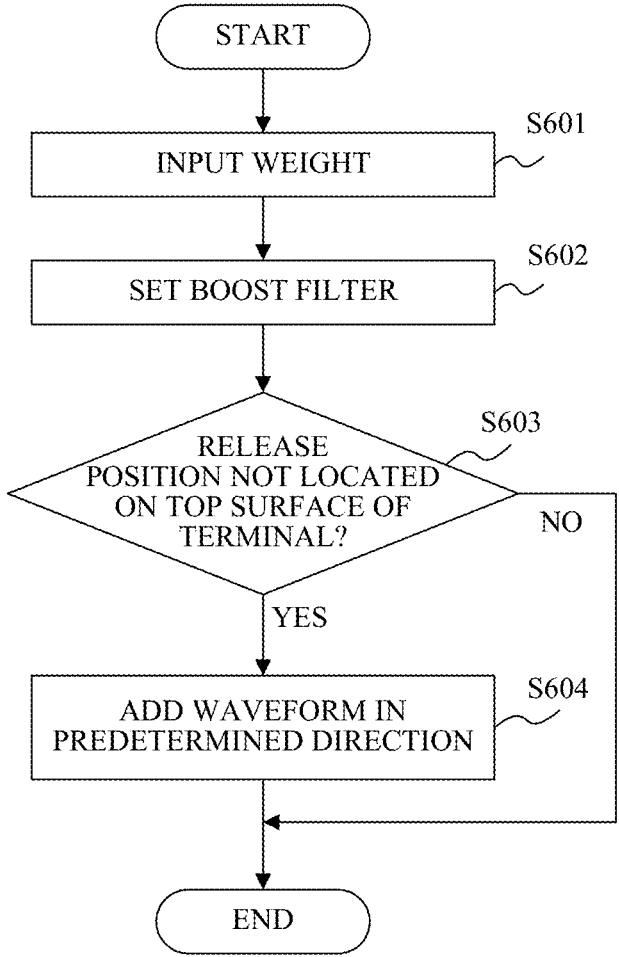
FIG. 6 is a flowchart of a waveform generating method according to this embodiment.

Referring now to FIG. 6, a description will be given of the excitation waveform adjustment (waveform generating method) by the excitation adjusting unit 23 according to this embodiment. FIG. 6 is a flowchart of the waveform generating method. First, in step S601, the weight of the camera to be measured is input to the excitation adjusting unit 23. At this time, the weight of the camera to be measured can be actually measured and input, or the weight of a catalog value can be input. Next, in step S602, the excitation adjusting unit 23 sets a boost filter based on the weight of the camera input in step S601.

Next, in step S603, it is determined whether or not the release position, that is, the release button is located on the top surface of the terminal parallel to the optical axis. In a case where the release button is located on the top surface of the terminal parallel to the optical axis (N), this flow ends. On the other hand, in a case where the release button is not located on the top surface of the terminal parallel to the optical axis (Y), the flow proceeds to step S604. Then, in step S604, the excitation adjusting unit 23 adds camera shake caused by the release operation to the excitation waveform in the rotation direction (predetermined direction) indicated by the arrow 45y in FIG. 4, and this flow ends. By adding a proper waveform according to the specification such as the weight of the camera and the position of the release button, a camera shake amount can be measured with high accuracy.

As described above, the excitation adjusting unit 23 adjusts the reference waveform data 22 by calculation based on the specification of the camera 11 and generates the excitation waveform data 13. The specification of the camera 11 is, for example, the weight of the camera 11. At this time, the excitation adjusting unit 23 may generate the excitation waveform data 13 by changing the gain applied to the entire waveform (overall frequency bands) of the reference waveform data 22 based on the weight of the camera 11. Moreover, the excitation adjusting unit 23 may generate the excitation waveform data 13 by applying a first gain to the reference waveform data 22 in a case where the weight of the camera 11 is a first weight. In a case where the weight of the camera 11 is a second weight lighter than the first weight, the excitation adjusting unit 23 applies a second gain larger than the first gain to the reference waveform data 22 and generates excitation waveform data 13.

In this embodiment, the excitation adjusting unit 23 may change the frequency characteristic of the reference waveform data 22 based on the weight of the camera 11. According to the inventors of the disclosure, the frequency characteristic of the applied shake varies depending on the weight of the camera 11. More specifically, in a case where cameras with different weights are compared, a relatively heavy camera has a larger ratio of low frequency components and a smaller ratio of high frequency components in the entire applied shake than those of a lightweight camera. Therefore, this embodiment changes the frequency characteristic such that the excitation waveform data applied to the light camera has a lower ratio of low frequency components and a higher ratio of high frequency components than those of the excitation waveform data applied to the heavy camera.

For example, in a case where the camera 11 is heavy, the high frequency components of the reference waveform data 22 may be attenuated, and in a case where the camera is lightweight, the low frequency components of the reference waveform data may be attenuated. In a case where the camera 11 is lightweight, the high frequency components of the reference waveform data 22 may be amplified, and in a case where the camera 11 is heavy, the low frequency components may be amplified. In addition to the ratio in the entire applied shake, in a case where the magnitude of the shake is compared, the lightweight cameras tend to have larger high-frequency shakes than the heavy cameras. Therefore, the excitation adjusting unit 23 may generate the excitation waveform such that the relatively lightweight cameras have a larger ratio of the high-frequency component in the entire applied shake and a larger magnitude of the high-frequency component than the heavy cameras. The excitation adjusting unit 23 may change the frequency characteristic by changing the gain applied to the entire waveform (overall frequency bands) or without changing the gain applied to the entire waveform. That is, the excitation adjusting unit 23 may generate the excitation waveform data 13 according to the weight of the camera 11 by changing the frequency characteristic instead of changing the gain applied to the entire waveform.

The specification of the camera 11 includes, for example, the position of the release button 43 of the camera 41. At this time, the excitation adjusting unit 23 may generate the excitation waveform data 13 by adding a waveform in a predetermined direction (rotation direction) to the reference waveform data 22 based on the position of the release button 43 of the camera 41. The excitation adjusting unit 23 may generate the excitation waveform data 13 by adding a waveform in a predetermined direction (specific excitation waveform) to the reference waveform data 22 in a case where the release button 43 is not located on a plane parallel to the optical axis 44 of the optical system of the camera 41 (the top surface of the terminal, that is, the top surface of the camera 41). The excitation adjusting unit 23 may generate the excitation waveform data 13 by adding a waveform in a predetermined direction to the reference waveform data 22 in a case where the release button 43 is located in front of the photographer.

In the above embodiment, the waveform generating apparatus 20 includes the excitation adjusting unit 23 and generates the excitation waveform data 13 by adjusting the reference waveform data 22 according to the specification of the camera 11 to be evaluated. However, the embodiment is not limited to this example. For example, a plurality of excitation waveform data are previously generated according to the specification and stored in the memory provided in the waveform generating apparatus 20. By selecting a proper excitation waveform in accordance with the acquired specification of the camera 11 in evaluating the camera 11, the camera 11 can be excited based on the proper excitation waveform. In other words, the camera may be excited by selecting first excitation waveform data for cameras having weights equal to or larger than a threshold, and second excitation waveform data which has a higher ratio of high-frequency components than that of the first excitation waveform data for cameras having weights smaller than the threshold. Three or more types of excitation waveform data may be prepared according to weight, or excitation waveform data to be used may be selected according to two or more parameters such as the weight and the position of release button 43.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

This embodiment can provide a waveform generating apparatus, a shake evaluating apparatus, a waveform generating method, and a storage medium, each of which can evaluate shake of an imaging unit with high accuracy.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

What is claimed is:

1. A waveform generating apparatus configured to generate an excitation waveform configured to excite an imaging unit in order to evaluate shake of the imaging unit, the waveform generating apparatus comprising:

a memory storing instructions; and a processor configured to execute the instructions to:

acquire a specification of the imaging unit, and adjust a reference waveform based on the specification of the imaging unit and generate the excitation waveform, wherein the specification includes a weight of the imaging unit, and wherein in a case where the weight of the imaging unit is a first value, the processor is configured to adjust the reference waveform to have a larger ratio of vibration equal to or smaller than a first frequency compared to a case where the weight of the imaging unit is a second value smaller than the first value.

2. The waveform generating apparatus according to claim 1, wherein the processor is configured to change a gain applied to an overall frequency band of the reference waveform based on the weight of the imaging unit and to generate the excitation waveform.

3. The waveform generating apparatus according to claim 1, wherein the processor is configured to generate:

the excitation waveform by applying a first gain to the reference waveform in a case where the weight of the imaging unit is a first weight, and the excitation waveform by adding a second gain larger than the first gain to the reference waveform in a case where the weight of the imaging unit is a second weight lighter than the first weight.

4. The waveform generating apparatus according to claim 1, wherein the specification includes a position of a release button of the imaging unit.

5. The waveform generating apparatus according to claim 4, wherein the processor is configured to generate the excitation waveform by adding a waveform in a predetermined direction to the reference waveform based on the position of the release button of the imaging unit.

6. The waveform generating apparatus according to claim 5, wherein the processor is configured to generate the excitation waveform by adding the waveform in the predetermined direction in a case where the release button is not located on a plane parallel to an optical axis of an optical system of the imaging unit.

7. The waveform generating apparatus according to claim 5, wherein the processor is configured to generate the excitation waveform by adding the waveform in the predetermined direction to the reference waveform in a case where the release button is located in front of a photographer.

8. The waveform generating apparatus according to claim 1, wherein the reference waveform is a model waveform created based on camera shake data of a plurality of imaging units.

9. A shake evaluating apparatus configured to evaluate shake of an imaging unit, the shake evaluating apparatus comprising:

an excitation unit configured to excite the imaging unit;

a waveform generating apparatus configured to generate an excitation waveform that is used for the excitation unit to excite the imaging unit; and an image evaluating unit configured to evaluate a captured image captured by the imaging unit while the imaging unit is excited with the excitation waveform, wherein the waveform generating apparatus includes:

a memory storing instructions; and a processor configured to execute the instructions to:

acquire a specification of the imaging unit, and adjust a reference waveform based on the specification of the imaging unit and generate the excitation waveform, wherein the specification includes a weight of the imaging unit, and wherein in a case where the weight of the imaging unit is a first value, the processor is configured to adjust the reference waveform to have a larger ratio of vibration equal to or smaller than a first frequency compared to a case where the weight of the imaging unit is a second value smaller than the first value.

10. A waveform generating method configured to generate an excitation waveform configured to excite an imaging unit in order to evaluate shake of the imaging unit, the waveform generating method comprising the steps of:

acquiring a specification of the imaging unit, and adjusting a reference waveform based on the specification of the imaging unit and generating the excitation waveform, wherein the specification includes a weight of the imaging unit, and wherein in a case where the weight of the imaging unit is a first value, adjusting the reference waveform to have a larger ratio of vibration equal to or smaller than a first frequency compared to a case where the weight of the imaging unit is a second value smaller than the first value.

11. A non-transitory computer-readable storage medium storing a program that causes a computer to execute the waveform generating method according to claim 10.

12. A measuring method of a shake amount of a camera, the measuring method comprising the steps of:

acquiring an excitation waveform according to mass of the camera fixed to an excitation table of an excitation apparatus;

acquiring an evaluation image by imaging an object while the excitation table is vibrated according to an acquired excitation waveform; and measuring a blur amount in an image based on the evaluation image, wherein the excitation waveform acquired in the step of acquiring the excitation waveform has a larger ratio of vibration equal to or smaller than a first frequency in a case where the mass of the camera has a first value, than that of a second value, which is smaller than the first value.

13. A non-transitory computer-readable storage medium storing a program that causes a computer to execute the waveform generating method according to claim 12.

14. The waveform generating apparatus according to claim 1, wherein in a case where the weight of the imaging unit is the first value, the processor is configured to adjust the reference waveform to have a larger ratio of low frequency compared to a case where the weight of the imaging unit is a second value smaller than the first value.

\* \* \* \* \*